United States Patent [19]
Billot

[11] 3,883,097
[45] May 13, 1975

[54] DEVICE FOR PICKING UP AND EJECTING LOADS UNDER AN AIRPLANE

[75] Inventor: Jean Billot, Levallois, France

[73] Assignee: Rafaut & Cie, Villeneuve La Garenne, France

[22] Filed: Dec. 10, 1973

[21] Appl. No.: 423,351

[30] Foreign Application Priority Data
Mar. 27, 1973 France .............................. 73.10960

[52] U.S. Cl. ............................ 244/137 R; 89/1.5 F
[51] Int. Cl. ............................................. B64c 1/22
[58] Field of Search ............ 89/1.5 F, 1.5 G, 1.5 R; 244/137 R; 294/83 AA, 83 AE

[56] References Cited
UNITED STATES PATENTS 2,822,207 2/1958 Steinmetz et al. .............. 294/83 AE
3,557,550 1/1971 Legarra ...................... 244/137 R X
3,610,094 10/1971 Craigie ...................... 244/137 R X FOREIGN PATENTS OR APPLICATIONS
1,199,093 12/1959 France ............................ 244/137 R
805,270 12/1958 United Kingdom ............. 244/137 R Primary Examiner—Trygve M. Blix
Assistant Examiner—Paul E. Sauberer
Attorney, Agent, or Firm—Breitenfeld & Levine

[57] ABSTRACT

A device for picking up and ejecting loads arranged under the girder of a carrier, such as an airplane. The device comprises two identical assemblies intended to cooperate with bore holes provided in the load to be carried, each assembly comprising wedge coupling means, lifting means for bringing the load against the girder, a single locking control, and means actuated by gases to uncouple the load and eject it.

5 Claims, 4 Drawing Figures

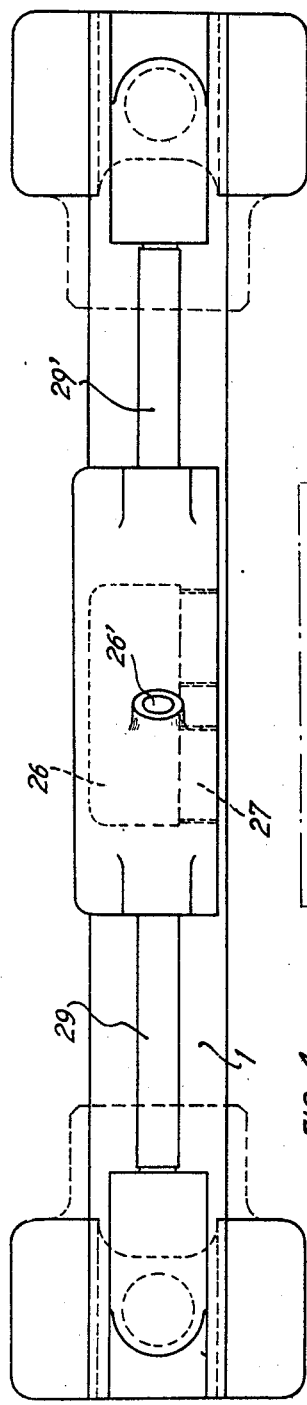
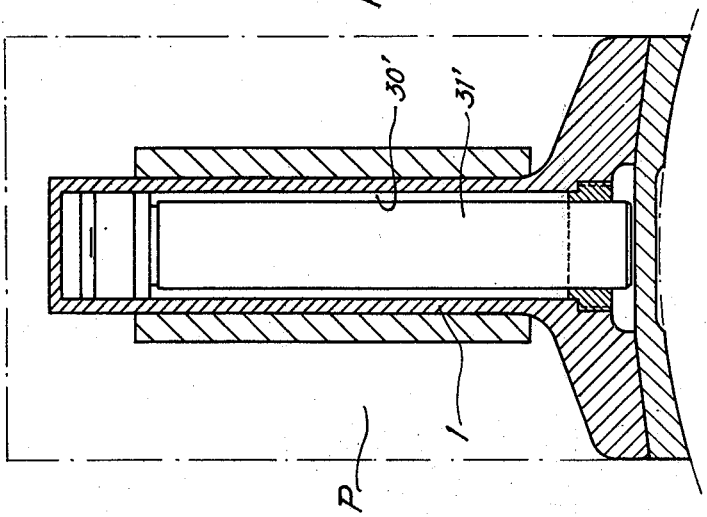

DEVICE FOR PICKING UP AND EJECTING LOADS UNDER AN AIRPLANE

The present invention relates to a device for picking up and ejecting loads such as bombs, containers, etc., the device being arranged under the girder of a carrier such as an airplane.

In accordance with the prior art, loads were hooked to rings forming part of a housing contained in the girder of the airplane. In order to prevent the load from swinging during transportation, it was held by wedge feet, that is to say, wedging screws or jacks connected to the load and in contact with the girder.

This arrangement has a number of drawbacks. For example, positioning takes a long time, since it is necessary to adjust several screws, generally four in number, on opposite sides of the load. Furthermore, a detrimental drag results due to the fact that the wedge feet remain permanently on the load.

The object of the present invention is to provide a device which, while fitting in the cavities present in the girders of airplanes, does not have the drawbacks indicated above.

A device in accordance with the invention, which is housed in the girder of the carrier, comprises essentially two identical assemblies intended to cooperate with corresponding bore holes provided in the load to be transported. Each assembly comprises wedge coupling means carried by a sleeve and activated by the relative displacement of a core with respect to said sleeve, lifting means for displacing the sleeve with respect to the device so as to bring the load against the carrier, and a kinematic linkage consisting of connecting rods connecting the core to a single lock-unlock control common to both assemblies. The device furthermore has a circuit for gas under pressure in order, on the one hand, to actuate the single control to cause the core to slide with respect to the sleeve, assuring the uncoupling of the load, and on the other hand, to actuate pistons which push the load away, thus assuring its ejection.

The wedge coupling means consist preferably of balls carried by the sleeve and which protrude, to cooperate with a bore in the load to be carried, under the action of a core portion of larger diameter upon the relative displacement of the core with respect to the sleeve. However, some other system of coupling, for instance by means of a split cone, also operating by wedge action, can also be provided. Similarly, the roles of the sleeve and of the core could be reversed.

The hoisting means are preferably actuated manually, for instance by means of a rack system.

The gases capable of actuating the single lock control and the ejection pistons may result from the combustion of a powder cartridge at the time the load is dropped.

The following description, together with the accompanying drawing, will make it clear how the invention can be reduced to practice.

In the drawing:

FIG. 3 is a cross-section along the line III/III of FIG. 1, and

FIG. 4 is a top view of the device in accordance with the invention.

Figure 1:
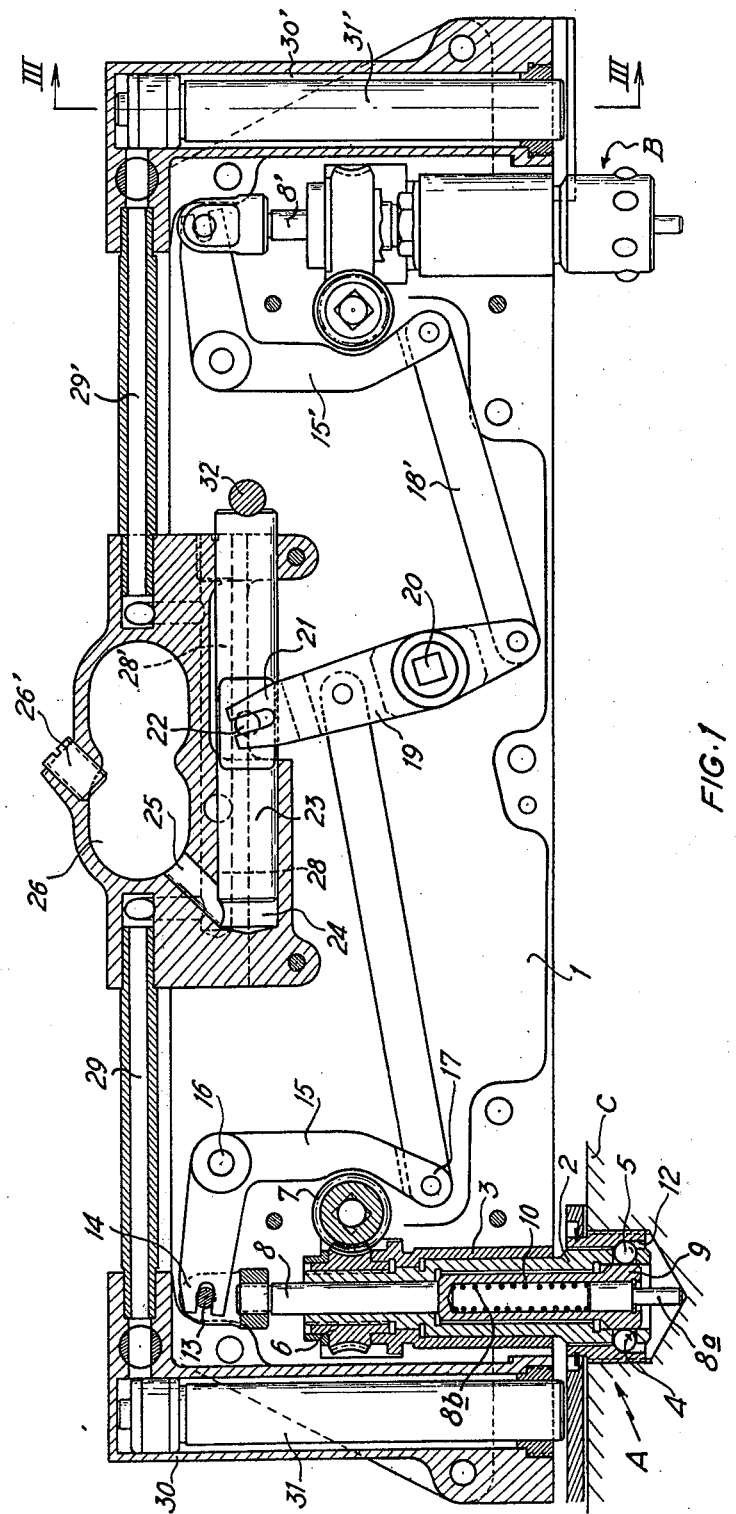
FIG. 1 is a vertical cross-section through a device according to the invention housed in the girder of an airplane, the parts being shown in coupled position with the load against the girder.

The device in accordance with the invention is in the form of a housing 1 contained within the girder P of an airplane. It is intended to effect the carrying and ejection of a load C. It comprises essentially two assemblies designated generally as A and B which are of identical structure and having the same function. Therefore only assembly A will be described in detail.

Assembly A comprises a vertically arranged sleeve 2 capable of sliding with respect to a fixed part 3 connected to the housing 1. At its lower end the sleeve has holes 4 which hold balls 5. At its upper end the sleeve 2 is connected to hoisting means, for instance in the form of a rack 6, 7.

Slidable within the sleeve 2 is a core 8 whose lower end has an enlarged portion 9 connected to the body 10 of the core by a conical portion 11. This enlarged portion 9 is intended to cooperate with the balls 5 in order to make them protrude out of the sleeve 2 and assure a wedging of these balls against a bore 12 provided for this purpose in the load C. On the other hand, when the body 10 is at the height of the balls, the balls are no longer pushed towards the outside of the sleeve 2 and the load C is no longer coupled.

At its lower end the core 8 is hollow, forming a recess for a push rod 8a which is subject to the action of a compression spring 8b; the free end of this push rod is intended to cooperate with the bottom of the bore 12 provided in the load to be transported.

At its upper end the core 8 carries a pin 13 engaged in a yoke 14 formed at the end of a bent-arm lever 15 which is adapted to pivot around a fixed pin 16. The other end 17 of the lever 15 is articulated to the end of a bar 18 which in turn is articulated at its other end to a lever 19, the latter pivoting around a fixed pin 20. This lever can be actuated manually, for instance by a handle (not shown) or a wrench. It constitutes a single locking (or unlocking) control common to both assemblies A and B. For this purpose it is connected to the upper end of the core 8' of the assembly B by a kinematic linkage 18', 15' similar to the linkage 18, 15.

One of the ends of the lever 19 has a fork 21 engaging a pin 22 carried by a piston 23 which slides within a bore 24 provided in the body of the housing 1. The bore 24 is connected by a channel 25 to a cavity 26 intended to contain a powder cartridge, the firing of which is assured by igniters located in bores 27 provided for this purpose. A safety plug 26' closes off the cavity 26.

The bore 24 accommodating piston 23 furthermore communicates via channels 28, 28', and 29, 29' with the inside of cylinders 30, 30' in which there are arranged pistons 31, 31' capable of moving downward towards the ends of the housing 1.

A safety pin 32 makes it possible to avoid accidental displacement of the piston 23 connected to the lever 19.

The device in accordance with the invention is used in the following manner after it has been installed within the girder P of the airplane.

Figure 2:
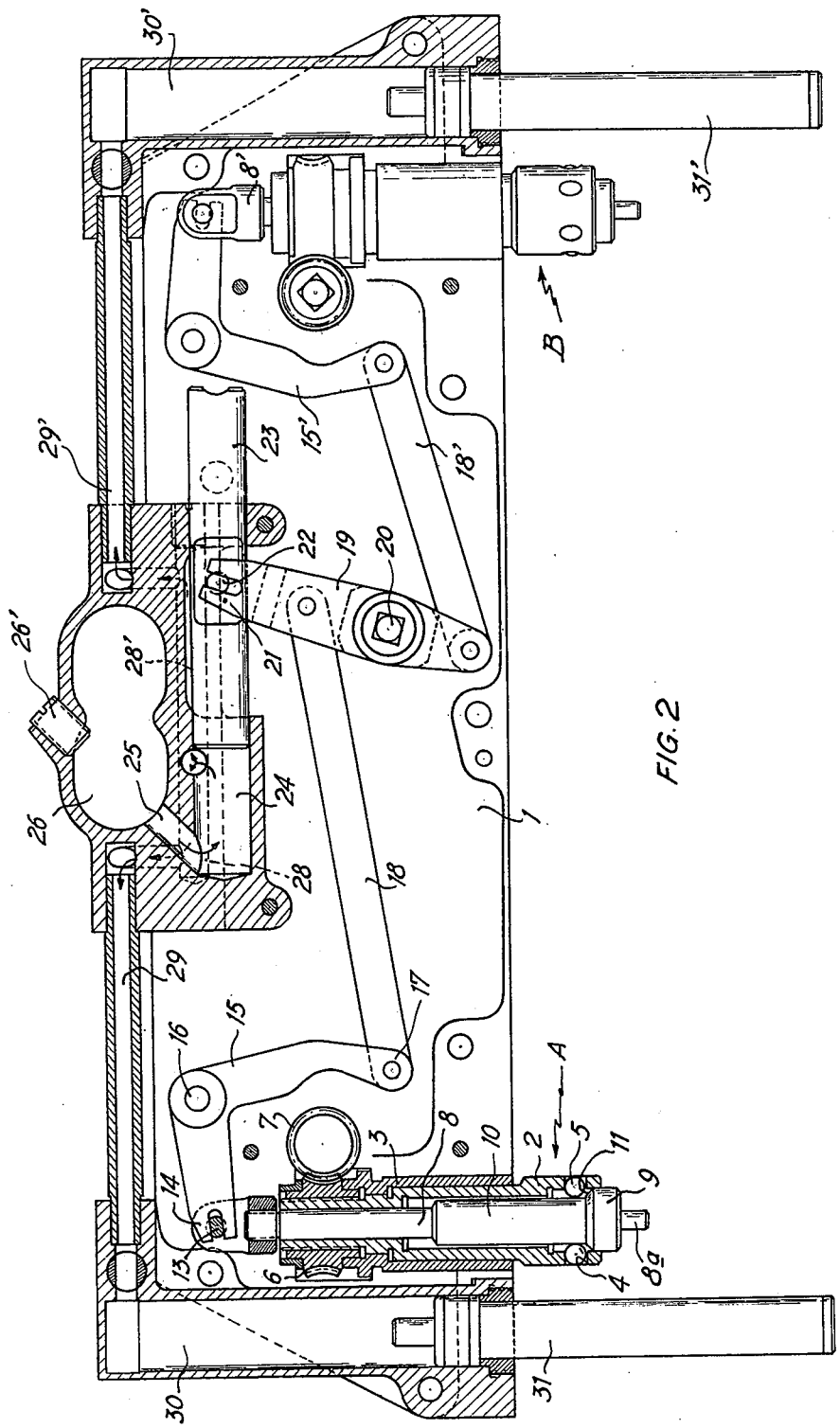
FIG. 2 is a similar view after uncoupling and ejection of the load.

In the initial configuration, the lever 19 is in the position shown in FIG. 2 in which the piston 23 is out of the bore 24. The lever 19 has been brought into this position either as a result of release of a load or by the manual operation of the lever. In this position, by the interaction of the bar 18 and the bent-arm lever 15 pivoting around the fixed pin 16, the core 8 is in a low position and the balls 5 are opposite the body 10 of the core, that is to say, in retracted position. By actuating the hoisting means 6, 7, the sleeve 2 is also brought into low position.

The lower end of the assembly A is engaged in the bore 12 of the load C. Of course, this operation which is effected at assembly A is simultaneously effected at assembly B. The bottom of the bore 12 pushes the push rod 8a back, compressing the spring 8b, and this action causes the core 8 to rise within the sleeve 2 in such a manner that the conical portion 11 and then the enlarged portion 9 come in contact with the balls 5, causing them to protrude from the sleeve 2. The load is thus coupled, as a result of wedging by these balls, at a small distance, of the order of a few millimeters, from the girder P. At the same time, the core 8, upon rising, actuates the kinematic linkage 18, 15, which causes the lever 19 to pivot and brings it into the position shown in FIG. 1 in which the piston 23 is pushed towards the left in the figure to the end of the bore 24.

Bringing of the load C against the girder is effected by raising each of the assemblies A and B via rack systems such as 6, 7, the balls 5 remaining in contact with the enlarged portions 9 of the cores, but at slightly different levels than the original levels.

In order to release the load, the powder cartridge contained in the cavity 26 is fired. The gases liberated by the combustion of this cartridge penetrate, via the channel 25, into the bore 24 and push the piston 23 back toward the right, it being understood that the safety pin 32 which blocks the piston in position has been previously removed. The movement of the piston causes the lever 19 to pivot so that the cores 8 and 8' are lowered, in accordance with what has been shown in FIG. 2. The body of each of the cores 8 and 8' comes opposite the balls 5 which can thus return into the sleeves 2. The wedging by means of these balls is now no longer effected and the load C is uncoupled.

Furthermore, the piston 23, upon arriving at the end of its stroke, uncovers the entrance to the channels 28 and 28' so that the gases resulting from the combustion of the powder cartridge and which have served to displace the piston 23 can flow into the channels 28, 28', and then 29, 29' and arrive in the cylinders 30 and 30' where they push the pistons 31 and 31' down. The latter then eject the load C which had been uncoupled immediately prior to this ejection operation.

It should be noted that the force of the springs 8b is selected in such a manner that the sliding of the cores 8 and 8', which gives rise to the uncoupling, does not occur in case of sudden acceleration of the carrier, which would have a tendency to move the piston 23 towards the right. In order for the piston to move and turn the lever 19, it is necessary that it be subjected to a force greater than that of the springs 8b, such as that produced by the combustion of the powder cartridge.

Moreover, if an accidental firing of the powder cartridge takes place while the safety pin 32 is still in position, the gases produced by the combustion of the powder cartridge will force the safety plug 26' out and can then escape.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A device for carrying and ejecting a load under an airplane, the load being formed with recesses in its surface, said device being housed within a girder of the airplane and comprising two carrying and ejecting assemblies and a single ejection controlling means for operating both carrying and ejecting assemblies, said unique ejection controlling means comprising:
a cylinder and a piston movable within said cylinder,
controllable means for introducing gas under pressure into said cylinder so as to move said piston,
a lever mechanically coupled to said piston and pivotally mounted on an axis fixed with respect to the airplane, said lever being pivoted around said axis upon movement of said piston in said cylinder, and each carrying and ejecting assembly comprising:
supporting means, cooperable with an abutment surface of a recess in the load, for supporting the load, said supporting means comprising a sleeve insertable into the recess and actuatable locking and releasing means carried by said sleeve for locking the load to or releasing the load from the supporting means,
a mechanical linkage connecting said lever to said actuatable locking and releasing means, for actuating said locking-releasing means upon movement of said piston, and
lifting means for lifting both said supporting means and said load when said supporting means are engaged in said recess of the load, so as to fasten said load against the girder of the airplane and maintain it steady during flight of the air-plane.

2. A device according to claim 1 wherein said actuatable locking and releasing means comprise balls carried in bores of the sleeve, and a core slidable within the sleeve to either force said balls to protrude from the sleeve, thereby preventing said sleeve from moving out of the recess provided in the load, or release said balls and therefore release the load from said supporting means, and wherein said mechanical linkage is connected to said core for sliding it within the sleeve.

3. A device according to claim 2 wherein said supporting means further include a push-rod and a compression spring, said push-rod being engageable with the bottom of the recess of the load and with said compression spring, and said compression spring being adapted to urge said core into a position where the balls protrude from the sleeve when said supporting means are engaged within the recess of the load.

4. A device according to claim 1 wherein said lifting means comprise a rack system.

5. A device according to claim 1 including a manually manipulable safety member arranged to prevent movement of said piston and mechanical linkage in a direction causing release of the load from said supporting means.

* * * * *